(12) United States Patent
Fascenda et al.

(10) Patent No.: US 9,209,969 B2
(45) Date of Patent: Dec. 8, 2015

(54) SYSTEM AND METHOD OF PER-PACKET KEYING

(75) Inventors: Anthony C. Fascenda, North Bethesda, MD (US); Emil Sturniolo, Medina, OH (US)

(73) Assignee: KOOLSPAN, INC., Bethesda, MD (US)

( * ) Notice: Subject to any disclaimer, the term of this patent is extended or adjusted under 35 U.S.C. 154(b) by 0 days.

(21) Appl. No.: 13/026,764

(22) Filed: Feb. 14, 2011

(65) Prior Publication Data

US 2011/0138170 A1  Jun. 9, 2011

Related U.S. Application Data

(63) Continuation of application No. 11/763,843, filed on Jun. 15, 2007, now Pat. No. 7,913,085.

(51) Int. Cl.
*H04L 9/08* (2006.01)
*H04L 29/06* (2006.01)

(52) U.S. Cl.
CPC .......... *H04L 9/0844* (2013.01); *H04L 63/0457* (2013.01); *H04L 63/0853* (2013.01); *H04L 63/0428* (2013.01); *H04L 2209/80* (2013.01)

(58) Field of Classification Search
CPC ................. H04L 63/0428; H04L 63/0457
USPC ..................... 713/169, 172; 380/37, 259, 262
See application file for complete search history.

(56) References Cited

U.S. PATENT DOCUMENTS

| | | | | |
|---|---|---|---|---|
| 5,124,117 A * | 6/1992 | Tatebayashi et al. | ......... | 380/281 |
| 5,371,794 A * | 12/1994 | Diffie et al. | ................... | 713/156 |
| 5,440,635 A * | 8/1995 | Bellovin et al. | ................ | 713/171 |
| 5,515,441 A * | 5/1996 | Faucher | ........................... | 380/30 |
| 5,535,276 A * | 7/1996 | Ganesan | ....................... | 713/155 |
| 6,026,165 A * | 2/2000 | Marino et al. | ................. | 380/273 |
| 6,707,914 B1 * | 3/2004 | Bell | ................. | 380/46 |
| 6,816,968 B1 * | 11/2004 | Walmsley | ..................... | 713/168 |
| 6,859,527 B1 * | 2/2005 | Banks et al. | ............. | 379/106.03 |
| 6,882,729 B2 * | 4/2005 | Arling et al. | .................. | 380/274 |
| 7,039,185 B2 * | 5/2006 | Campagna et al. | ............. | 380/43 |
| 7,190,793 B2 * | 3/2007 | Hsu | ................. | 380/270 |
| RE39,589 E * | 4/2007 | Raivisto | ........................ | 455/410 |
| 7,325,134 B2 * | 1/2008 | Fascenda | ....................... | 713/169 |
| 7,395,435 B2 * | 7/2008 | Benhammou et al. | ........ | 713/185 |
| 7,600,121 B2 * | 10/2009 | Davin | ........................... | 713/170 |
| 7,660,419 B1 * | 2/2010 | Ho | ................. | 380/270 |
| 7,907,735 B2 * | 3/2011 | Fascenda et al. | ............. | 380/278 |
| 7,913,085 B2 | 3/2011 | Fascenda | | |
| 8,195,941 B2 * | 6/2012 | Fontana et al. | ............... | 713/169 |

(Continued)

OTHER PUBLICATIONS

The difference between AES and TKIP; askeville by amazon; accessed Apr. 30, 2013; article date: 64 months prior to date of access so around Jan. 2008.*
A Remote Authentication Scheme Preserving User Anonymity; Hung-Yu Chien, Che-Hao Chen; Proceedings of the 19th International Conference on Advanced Information Networking and Applications (AINA'05).*
Temporal Key Integrity Protocol (TKIP); Laxmi Nissanka Roo et al.; Spring 2005; retrieved from www.cs.sjsu.edu/~stamp/CS265/projects/Spr05/ppt/TKIP.ppt.*

(Continued)

*Primary Examiner* — James Turchen
(74) *Attorney, Agent, or Firm* — Hunton & Williams LLP (57) ABSTRACT

A method of per-packet keying for encrypting and decrypting data transferred between two or more parties, each party having knowledge of a shared key that allows a per-packet key to differ for each packet is provided. Avoiding the use of a static session key during encryption offers several advantages over existing encryption methods. For example, rejecting packets received with duplicate sequence numbers, or sequence numbers that are beyond a specified deviation range mitigates Replay Attacks.

22 Claims, 7 Drawing Sheets

Network Example

(56) References Cited

U.S. PATENT DOCUMENTS

| | | | |
|---|---|---|---|
| 8,296,566 B2* | 10/2012 | Fontana et al. | 713/169 |
| 2003/0210788 A1* | 11/2003 | Billhartz et al. | 380/270 |
| 2003/0235305 A1* | 12/2003 | Hsu | 380/247 |
| 2004/0081321 A1* | 4/2004 | Struik | 380/278 |
| 2008/0313464 A1* | 12/2008 | Fascenda et al. | 713/171 |

OTHER PUBLICATIONS

Wireless Security: The need for WPA and 802.11i; Abuzar Amini; Mar. 31, 2007.*

* cited by examiner

Fig. 1: Network Example

Fig 2: Smart-Card Enabled Components - Client

Fig 3: Smart-Card Enabled Network Component - Lock

Fig 4: Authentication Sequence

Fig 5: Per-Packet Keying Sequence

1. Obtain Session Key = Base Session Key ("BSK")
2. Generate Random Number from Smart Card: Starting Sequence Number (SSN, 32 bits)
3. Add sequence number to SSN (starting with zero)--> SN
4. Encrypt SN with Session Key --> "IV" (128 bits)
5. Take 2's Complement of IV --> IV' (128 bits)
6. Concatenate IV + IV' = 256 bits --> "Offset"
7. BSK xor Offset = Per-Packet Key ("PPK")
8. Encrypt first packet data with "PPK"
9. Pre-pend ciphertext with SN (hint on calculating offset)
10. Increment SN
11. Repeat steps 3-10

Decrypting Received Packet
1. Remove 32-bit SSN from packet and calculate "Offset" as above leaving encrypted data (ciphertext) as remainder
2. BSK xor Offset = PPK
3. Decrypt ciphertext with PPK = decrypted data

SYSTEM AND METHOD OF PER-PACKET KEYING

CROSS-REFERENCE TO RELATED APPLICATIONS

The present application is a continuation of U.S. patent application Ser. No. 11/763,843, entitled "System and Method of Per-Packet Keying," filed Jun. 15, 2007, which is related to U.S. patent application Ser. No. 10/679,371, entitled "Localized Network Authentication and Security Using Tamper-Resistant Keys," filed on Oct. 7, 2003, to U.S. patent application Ser. No. 11/001,084, entitled "Remote, Secure Authorization," filed Dec. 2, 2004, and to U.S. patent application Ser. No. 10/935,123, entitled "Subnet Box," filed on Sep. 8, 2004 all of whose contents are incorporated by reference herein in their entireties.

FIELD OF THE INVENTION

The present invention generally relates to encrypting stored data or data transferred between two or more parties, such as over a virtual private network connection or wireless link. More particularly, the present invention relates to a method of generating or deriving per-packet, per file, or per datum keying used for encrypting and decrypting data.

BACKGROUND OF THE INVENTION

Encryption techniques typically provide for a "session key" for encrypting data sent across a communications link. The session key may be generated on one side of the link or the other. The session key is often exchanged from one side to the other such that both sides have the same key to use for encryption. The session key may be a symmetric key where the same key is used by both sides (sender and receiver) to send and receive data. Exemplary symmetric encryption techniques include Advanced Encryption Standard (AES), Data Encryption Standard (DES), and Triple Data Encryption Standard (3DES). The session key may also be an asymmetric key, such as in a public/private key pair where the private key is used to encrypt and the public key is used to decrypt information (or vice-versa). In either case, the session key is utilized throughout the session for encrypting each packet of data with the same key (symmetric, public or private).

In general, prior art encryption techniques are vulnerable to various attacks. Utilization of a constant key for encryption can leave the encryption process vulnerable to a "Dictionary Attack" where large numbers of packets can be analyzed to deduce the session key. In addition, prior art encryption techniques are often vulnerable to "Replay Attacks." Replay Attacks succeed by recording transmission for replay later. Even though the attacker might not be able to decrypt a packet, the attacker will replay the packets later to spoof legitimate transmissions.

SUMMARY OF CERTAIN EMBODIMENT OF THE INVENTION

According to a first embodiment of the invention, a method of establishing a shared base session key among two or more parties and for providing per packet keying for encrypting data transferred between the two or more parties is presented. The method includes generating a random number, mathematically transforming the random number to form a sequence number, encrypting the sequence number with the base session key to form an initialization vector, and concatenating the initialization vector with a function of the initialization vector, to form an offset. The method further includes determining a per packet key as the offset xor the base session key, encrypting plain text data with the per packet key to generate ciphertext, communicating the ciphertext prepended with the sequence number, and mathematically transforming the sequence number to calculate a next per packet key.

Various optional features of the first embodiment include the following. The step of mathematically transforming may include adding a fixed number. The step of incrementing may include adding a Fibonacci sequence number.

According to a second embodiment of the invention, a method of establishing a shared base session key among two or more parties and for providing per packet keying for decrypting data transferred between the two or more parties is presented. The method includes receiving a data packet compromising of a ciphertext portion and a sequence number, extracting the sequence number from the received data packet, encrypting the sequence number with the base session key to form an initialization vector, and concatenating the initialization vector with a function of the initialization vector, to form an offset. The method further includes determining a per packet key, identical to a key used to generate the ciphertext portion of the received data packet, as the offset xor the base session key, and decrypting the ciphertext portion of the received data packet using the per packet key to reveal original plain text.

According to a third embodiment of the invention, a method of establishing a shared key among two or more parties and for providing per packet keying where a different key is provided for each packet for encrypting data transferred between the two or more parties is presented. The method includes mathematically transforming, by the first party, a session number, forming, by the first party, an offset as a function of the session number, and offsetting, by the first party, the shared key by the offset to create a per packet key. The method further includes encrypting, by the first party, plain text data of a first packet with the per packet key to generate ciphertext, communicating, by the first party, the ciphertext along with an index associated with the per packet key to a second party, and repeating, by the first party, for each data packet to be communicated to the second party, the step of mathematically transforming the session number. The method further includes repeating, by the first party, for each data packet to be communicated to the second party, the step of forming an offset as a function of the session number, repeating, by the first party, for each data packet to be communicated to the second party, the step of offsetting by the offset the shared key to create a new per packet key repeating, by the first party, for each data packet to be communicated to the second party, the step of encrypting plain text data to generate ciphertext, and repeating, by the first party, for each data packet to be communicated to the second party, the step of communicating ciphertext along with an index associated with a per packet key. Each per packet key used to encrypt data by the first party is different for each data packet communicated and is different from each per packet key used to encrypt data by the second party.

Various optional features of the third embodiment include the following. The step of mathematically transforming may include adding a fixed number to the session number. The step of mathematically transforming may include adding a Fibonacci number to the session number. The function of the session number may include an exclusive OR function.

According to a fourth embodiment of the invention, a method of establishing a shared key among two or more parties and for providing per packet keying where a different key is provided for each packet for decrypting data transferred between the two or more parties is presented. The method includes receiving, by the second party from the first party, communicated data compromising of a ciphertext portion and an index, extracting by the second party of the index from the received data packet, and forming, by the second party, an offset as a function of the index. The method further includes offsetting by the second party the shared key by the offset to create a per packet key identical to a per packet key used to generate the ciphertext portion of the received data packet, decrypting by the second party the ciphertext portion of the received data packet using the per packet key to reveal original plain text, and repeating by the second party, and for each data packet received from the first party, the step of extracting the index from the received data packet. The method further includes repeating by the second party, and for each data packet received from the first party, the step of forming an offset as a function of the index, repeating by the second party, and for each data packet received from the first party, the step of offsetting the shared key by the offset to create a per packet key identical to a per packet key used to generate the ciphertext portion of the received data packet, and repeating by the second party, and for each data packet received from the first party, the step of decrypting the ciphertext portion of the received data packet using the per packet key to reveal original plain text. Each per packet key used to decrypt data by the first party is different for each data packet received and is different from each per packet key used to decrypt data by the second party.

An optional feature of the fourth embodiment includes that the function of the index comprises an exclusive OR function.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which.

DETAILED DESCRIPTION OF EMBODIMENTS

In an exemplary embodiment of the present invention, a session key is employed, but not utilized for encrypting a plaintext payload. Instead, the session key is designated as a base session key ("BSK") and is shared by both sides of the communication link. The BSK is used to create a new per-packet key for each data packet transmitted. In such an embodiment, an offset value that changes with each packet is logically added to the BSK such that a new per-packet key, offset from the session key, is used to encrypt and decrypt plaintext data. Embodiments of the present invention may provide such an offset from a smart-card-enabled random number generator independently on each side of the communications link such that the per-packet key is not only different for each packet but also different in each direction of communication. The BSK is not exchanged, but instead calculated as a result of a mutual authentication process occurring on both sides of the communications link. This entirely prevents dictionary attacks, as the encryption keys for each packet and in each direction are different and never utilized in succession. The mutual authentication process referred to above, by the way of non-limiting example, may be enabled using a smart card.

Although certain embodiments of the present invention include computing devices such as personal computers and network-based lock devices, the invention is not so limited. By way of non-limiting example, devices communicating in accordance with certain embodiments of the present invention include headless devices where there may be no user or user input device present, e.g., sensor devices, Supervisory Control and Data Acquisition ("SCADA") devices, video or audio surveillance systems, home control or alarm systems, lighting systems, etc. Other devices communicating in accordance with certain embodiments of the present invention include mobile communications devices such as, by way of non-limiting example, personal digital assistants and mobile phones.

Although certain embodiments of the present invention include tokens such as smart cards, the invention is not so limited. By way of non-limiting example, tokens and techniques for their connection according to certain embodiments of the invention include network-based smartcards that are connected to devices over a network connection, subscriber identity modules, Secure Digital devices, FPGA devices, ASIC devices, etc.

Although certain embodiments of the present invention are described in the context of a remote access network, embodiments of the present invention are applicable to any communication networks where two or more parties communicate using encrypted communications. By way of non-limiting example, the present invention may enable secure end-to-end access between a remote client and any computer residing on a network backbone.

Although certain embodiments of the present invention include communications channels such as computer networks, the invention is not so limited. For example, communications channels according to certain embodiments of the invention include computer memory devices (e.g., hard drive, flash devices, floppy disks, optical devices such as optical disks, shared memory, etc.). These memory devices may be transferred from one device to another or may be used to pass data from one environment to another, where the environments may or may not reside on the same physical machine.

Furthermore, the invention is not limited to communications. Rather, certain embodiments of the present invention encrypt stored data that is later retrieved according to features described herein.

Figure 1:
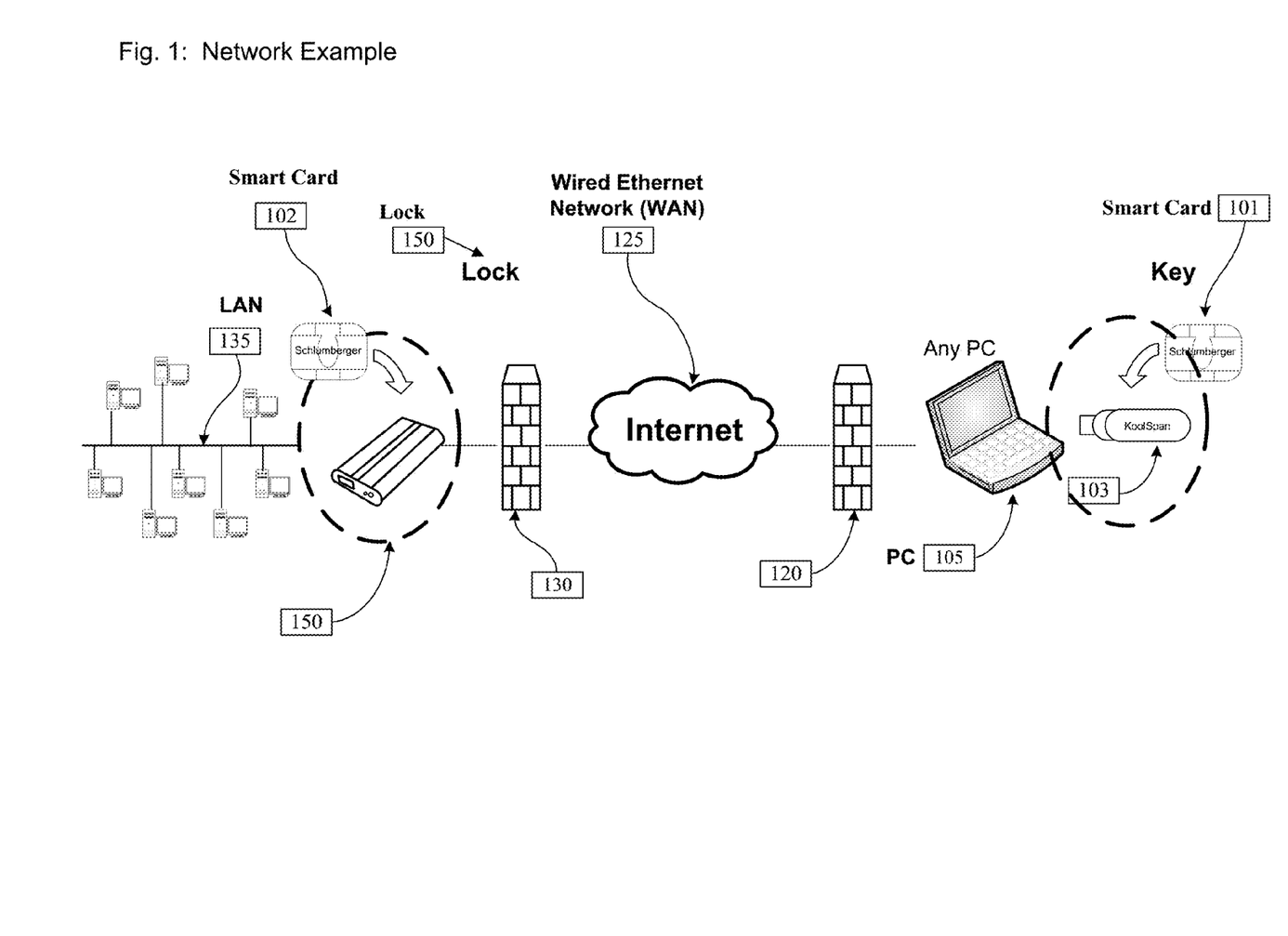
FIG. 1 is a schematic diagram of a typical network connection between a remote user and office Local Area Network according to an embodiment of the present invention.

FIG. 1 illustrates a network connection between a remote user and office local area network according to an embodiment of the present invention. In particular, the present embodiment implements a technique of per-packet keying. The present embodiment employs a combination of software routines and physical tokens in the form of easy-to-use client adapters (103), each containing a smart card (101), that attach to existing computing devices (105) and network-based lock devices (150), each containing an embedded smart card (102). A lock (150) is a device that authenticates users and bridges their ethernet traffic onto a network. These smart cards are secure, tamper-resistant, and pre-provisioned with secure authentication keys.

In reference to the embodiment of FIG. 1, no encryption keys are stored in the smart cards, instead the encryption keys are calculated as a result of authentication at the edge of the network. "Edge" refers to authentication of client devices taking place at the edge or outer boundary of the network, i.e., at the lock (150), rather than centralized within the network using a server. Client computing devices (105) are authenticated across wired or wireless links (125) using secret cryptographic authentication keys, which are pre-stored in the smart cards (101, 102) installed at both the client's computing device and the network-based lock device (150). According to the embodiment of FIG. 1, a lock device (150) is installed in the network providing a terminus of the communication between the local area network (135) and the remote user (105). In other embodiments, the lock may be a standalone device such as a KoolSpan SecureEdge Lock, or an appliance containing lock functionality such as a Dell PowerEdge Server running KoolSpan software. In yet other embodiments, the lock may be of the form of a client, which would allow for peer-to-peer secure communication.

Figure 2:
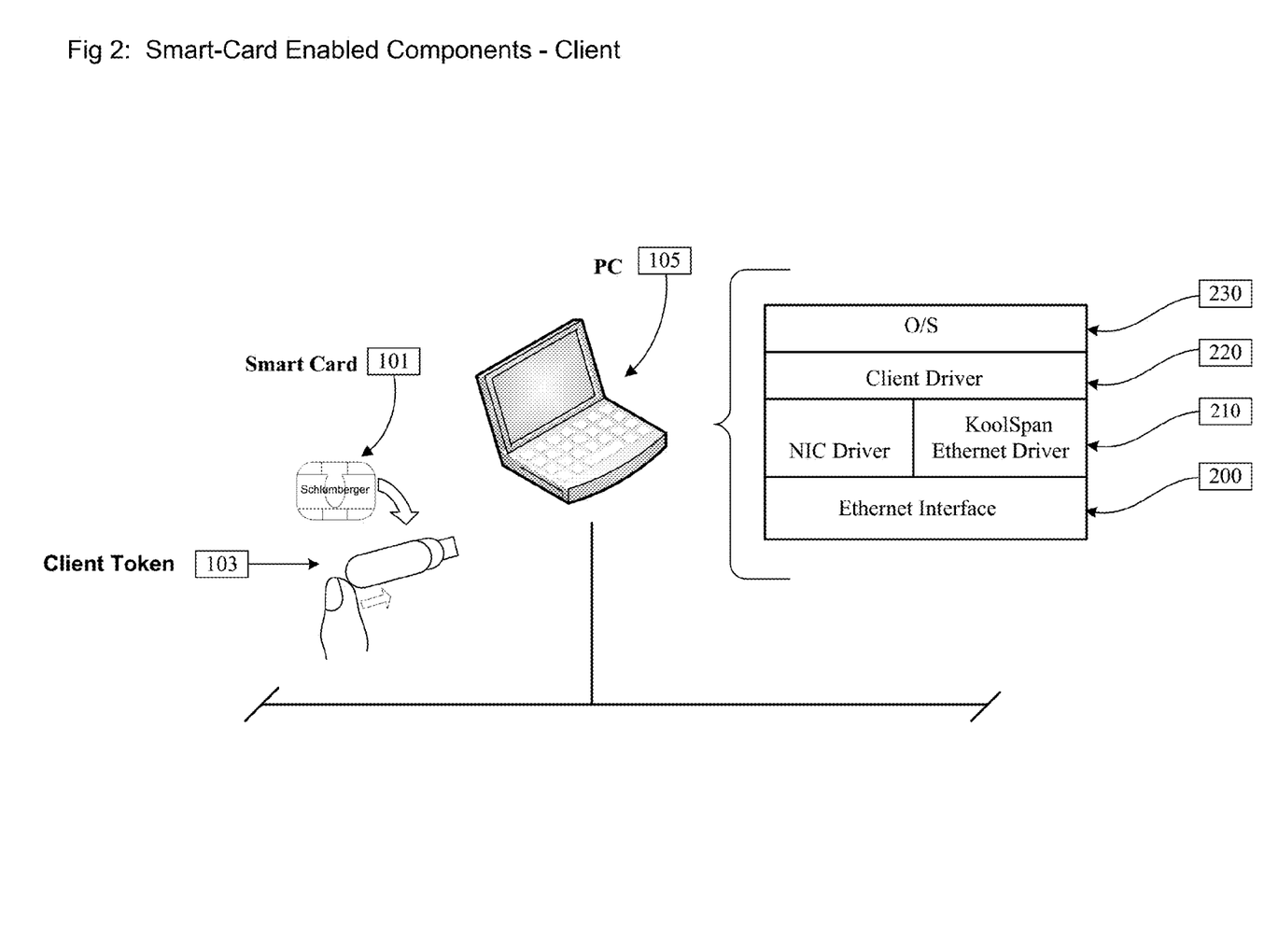
FIG. 2 is a schematic diagram of typical elements of an end-user system with smart card authentication and security according to an embodiment of the present invention.

FIG. 2 illustrates certain elements of an end-user system with smart card authentication and security according to an embodiment of the present invention. In particular, FIG. 2 shows an end-user configuration consisting of a personal computer ("PC") (105) and smart card (101) inserted into a universal serial bus smart card reader or client token (103). The actual interface between the smart card and PC can be implemented in numerous ways known to those of ordinary skill in the art. For example, U.S. patent application Ser. No. 10/679,371, entitled "Localized Network Authentication and Security Using Tamper-Resistant Keys," discusses exemplary techniques. Varied implementations may include serial readers, parallel readers, Personal Computer Memory Card International Association ("PCMCIA") readers, etc. The client token may even be embedded directly into the PC itself. The end-user configuration also contains client driver (210/220) software installed on PC (105). Client driver (220) is designed such that it will recognize the insertion and removal of client token (105) containing smart card (101). When inserted into PC (105), client driver (220) will present a Personal Identification Number ("PIN") entry dialog to the user via the operating system (230). One purpose of the PIN-entry dialog is to "unlock" the token by the legitimate user. Incorrect entry of the PIN after a preset number of attempts will cause smart card (101) to "lock up" and be of no further use. Once the PIN process is completed, the authentication sequence to remote lock device (150) is initiated.

Figure 3:
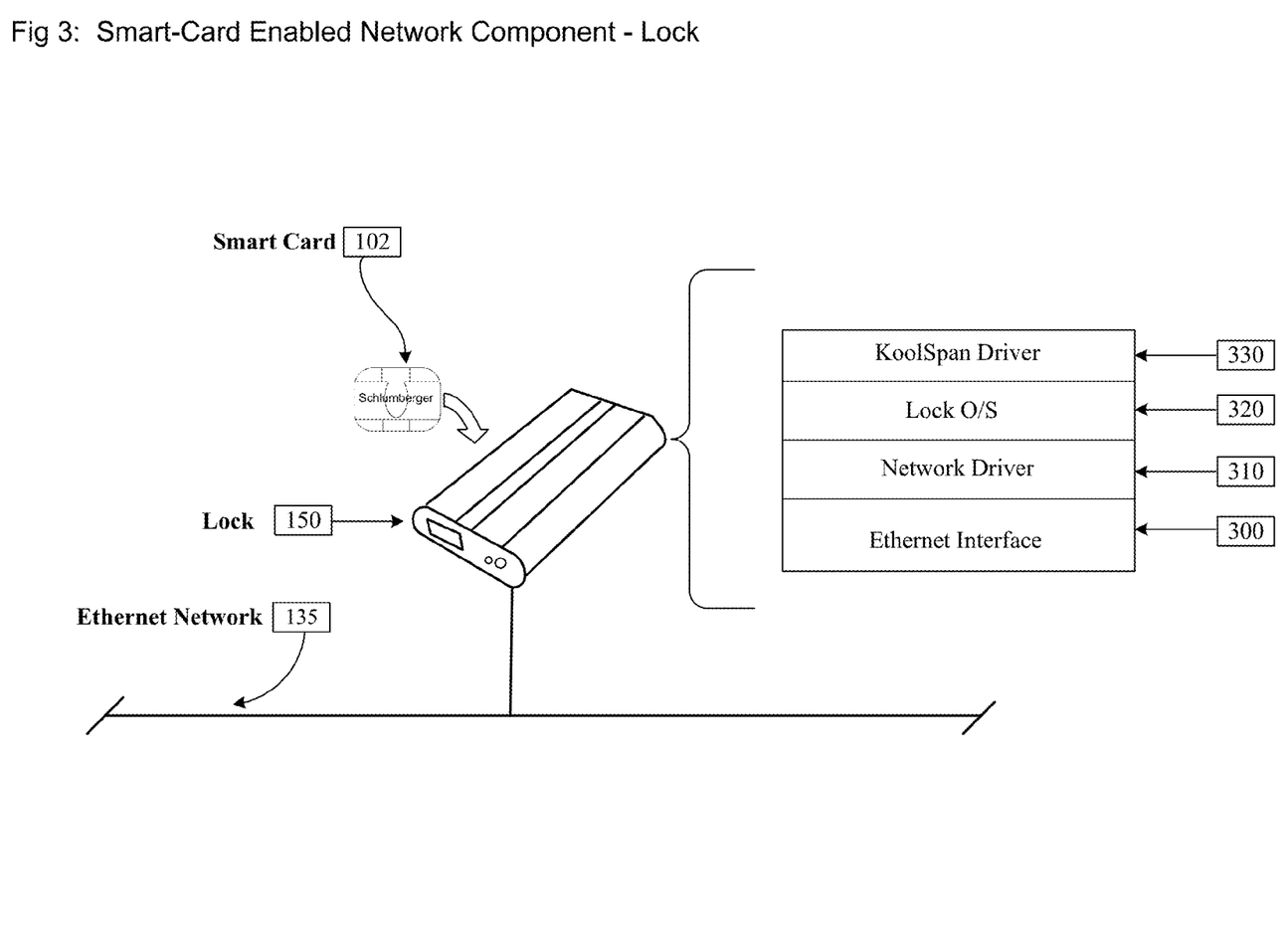
FIG. 3 is a schematic diagram of typical elements of a smart card equipped "lock" device according to an embodiment of the present invention.

FIG. 3 illustrates certain elements of a smart card equipped lock device according to an embodiment of the present invention. In particular, FIG. 3 shows network-based lock device (150) attached to local area network (135), which also contains an embedded smart card (102). The operating system of the lock (320) and driver (330) process received ethernet frames from the ethernet interface (300). The lock device (150) can be implemented in numerous ways known to those of ordinary skill in the art. For example, U.S. patent application Ser. No. 10/935,123, entitled "Subnet Box," discusses exemplary techniques.

Figure 4:
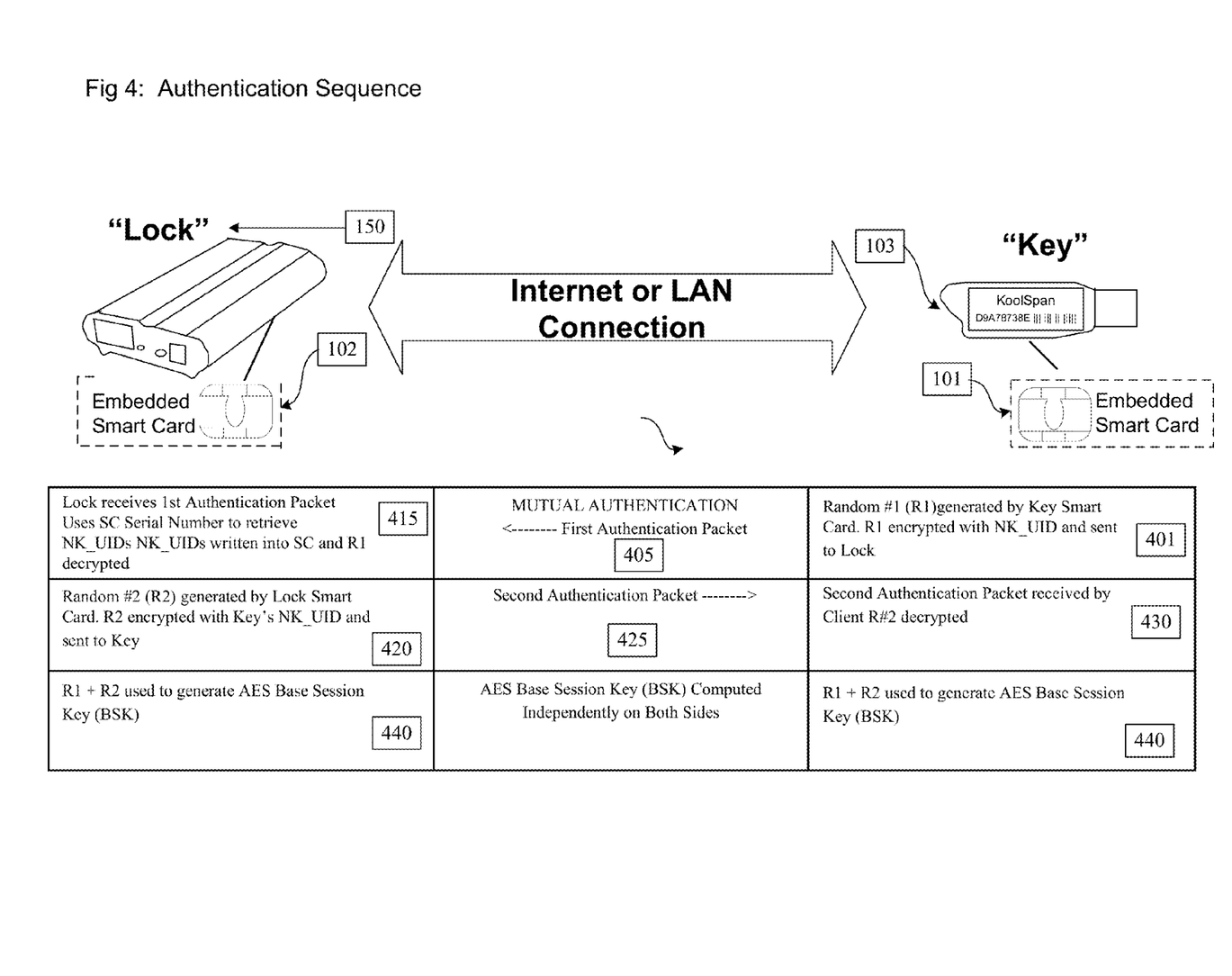
FIG. 4 is a schematic diagram of a typical authentication sequence of two smart-card-enabled endpoints according to an embodiment of the present invention.

FIG. 4 illustrates an authentication sequence of two smart-card enabled endpoints according to an embodiment of the present invention. In particular, FIG. 4 shows a successful authentication sequence involving the exchange of an encrypted random number generated by the smart cards on each side of the link (the lock smart card (102) and the client smart card (101)) and sent to the other side for decryption. In the present embodiment, the exchange of encrypted random numbers is achieved by allowing the lock to retrieve the client's secret encryption key and use it for encrypting and decrypting data sent back and forth.

An exemplary authentication process begins when a first random number (step 401) is generated by the client smart card (101) and is encrypted by the secret key pre-stored in the client smart card yielding ciphertext. The secret encryption key, the NK_UIDs, is the client's secret key that is only assigned to authorized client tokens, and is mapped to a unique serial number that identifies the client token. Once the ciphertext is generated, it is sent to the lock along with the serial number of the client smart card in a first authentication packet (step 405). During authentication, the client driver (220) sends a first encrypted random number along with the plaintext serial number of the user's smart card (101). The lock is provisioned with a database of serial numbers of authorized users and their corresponding NK_UIDs keys.

When the lock receives the first authentication packet (step 415) it uses the serial number of the client smart card contained in the first authentication packet to retrieve the enciphered version of the client smart cards' NK_UIDs in the lock database. The lock database contains a mapping of client smart card serial numbers to corresponding NK_UIDs keys. During authentication, the user's serial number is utilized to retrieve the enciphered version of the user's NK_UIDs key from its database and is then written in enciphered form into the lock's smart card (102) where it is automatically deciphered by the lock's smart card (102). At that instant in time, the lock's smart card (102) contains exactly the same NK_UIDs key of the authenticating user. Then the lock's smart card decrypts the first encrypted random number in step 415. Appropriate checks and balances are incorporated to ensure that a successful decryption can be detected.

In Step 420, a second random number is generated by the lock's smart card (102) and encrypted with the same user's NK_UIDs key still in the lock's smart card. The ciphertext is then returned to the user in a second packet (step 425). The client driver software (220) utilizes the client smart card (101) to decrypt the ciphertext, yielding a second random (step 430).

Both the lock (150) and client driver (220) then calculate the session key by a multi-step process (step 440). Both sides concatenate the two 256-bit random numbers exchanged across the link. The 512-bit concatenated string is then hashed eight times in succession with the digests of each of the eight hash operations themselves concatenated. The resulting 1280-bit digest is then "collapsed" by using the Exclusive-Or function on each group of five bits. This results in the 256-bit session key.

Authentication according to embodiments of the present invention is not limited to the techniques of FIG. 4. The authentication sequence can be implemented in numerous ways known to those of ordinary skill in the art. For example, U.S. patent application Ser. No. 11/001,084, entitled "Remote, Secure Authorization," discusses exemplary techniques.

Figure 5:
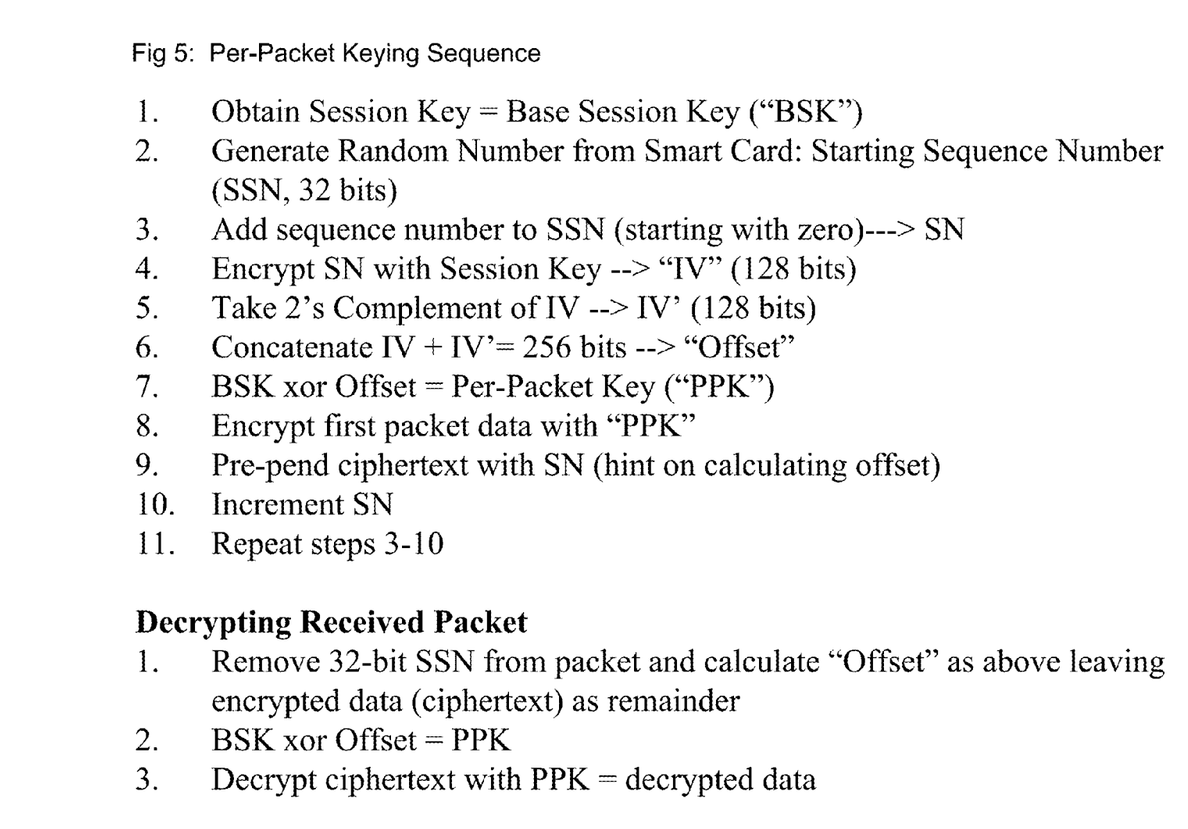
FIG. 5 is a flow chart of a step-by-step procedure for calculating a per-packet key according to an embodiment of the present invention.
Figure 6:
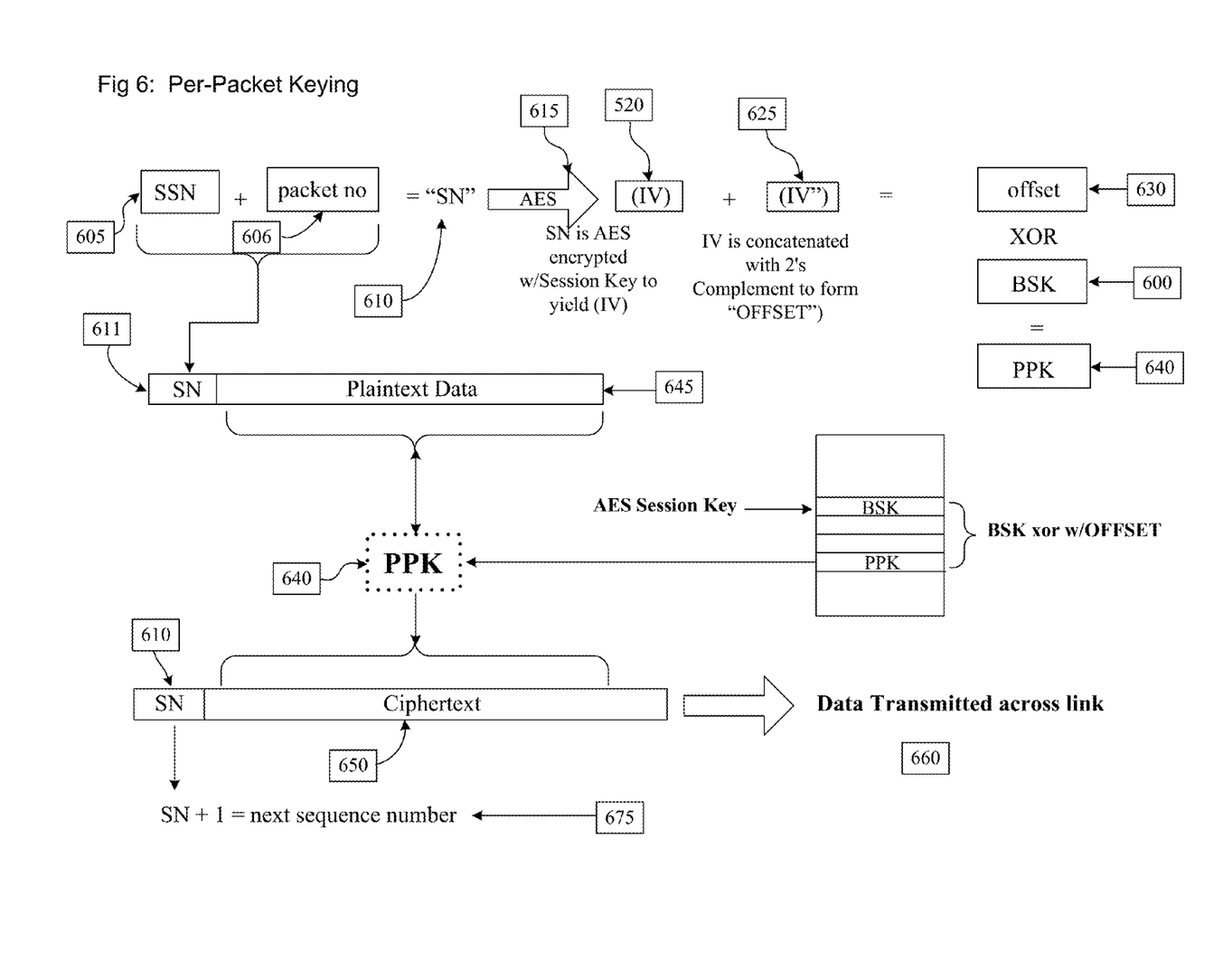
FIG. 6 is a schematic diagram of a step-by-step procedure for calculating a per-packet key according to an embodiment of the present invention.

As illustrated in FIG. 5 and FIG. 6, a session key is designated as the BSK. The session key is identical on both sides of the link and, in the prior art, could be utilized for all subsequent communications. However, the present embodiment provides a series of steps to encrypt bulk plaintext data that avoids using the session key. In such embodiments plaintext data is instead encrypted with a changing per-packet key.

FIGS. 5 and 6 illustrate a step-by-step procedure of calculating a per-packet key according to an embodiment of the present invention. After the 256-bit session key is generated on each side, each smart card (101, 102) independently generates a further random number. The random number is known as the starting sequence number ("SSN") (605). The random number on each side is then incremented for each transmitted packet starting with the number zero (step 606). This number becomes the sequence number ("SN") (610). The SN is then encrypted with the BSK to yield the initialization vector ("IV") (620). Any encryption algorithm may be used in this capacity, including, by way of non-limiting example, AES, DES, or 3DES. The IV is then concatenated with the two's complement of itself (step 625) to form the offset (step 630). Then the offset is exclusive-OR'd with the BSK (600) to form the PPK (640). The exclusive-OR step is very fast in hardware and ensures that the resulting PPK can be anywhere in the 256-bit key space as it avoids the "carry" bit that would normally have to be dealt with if the function were a straight binary addition. However, certain embodiments utilize such binary addition.

The PPK is different on each side of the link as the SSN is different on each side. Note that even though the BSK is identical on both sides of the link, the PPK will be different in each direction as it is based on a different SSN. Further, as the SN is incremented with each packet, the PPK is further differentiated.

Next, the plaintext data (645) is encrypted with the PPK (440) to yield ciphertext (650). Any existing encryption algorithm may be used in this capacity, including, by way of non-limiting example, AES, DES, or 3DES. The ciphertext is then pre-pended with the SN (611), which is the same SN used in the calculation (610) to form the data packet (660) transmitted across the link. Finally, the SN (610) is incremented for calculating the next PPK for the next packet (step 675).

Although the one embodiment illustrates a simple increment of the SN, any method of sequencing can be utilized such that the other side, if knowing the sequence allows for obtaining the SN utilized to calculate the PPK. For example, the SN can be a simple sequential number starting from zero or some random number generated by the smart card. The sequence number transmitted may even be the index of the SN utilized in the calculation. By the way of a non-limiting example, if the sequence number for each packet were simply 0, 1, 2, 3, 4, 5 etc., these may be transmitted as is, one number for each packet. However, this number may be used as an index to a Fibonacci sequence where "3" represents the third number in a Fibonacci sequence ("3"→"5" and "4"→"7" etc.). The receiving side would know the algorithm by which the SN in the computation (610) is derived from the SN used in transmission (611). As another example of incrementing, squaring the number and calculating a remainder after dividing by a particular, fixed, number may be used at each increment. That is, if $SN_n$ represents a session number and $SN_{n+1}$ represents its increment, then $SN_{n+1}$ may be calculated according to the formula: $SN_{+1}=(SN_n)^2 \mod X$, where X denotes a fixed number, which may be a prime number, and "mod" indicates modular arithmetic. In certain embodiments, exponents other than two may be used.

Figure 7:
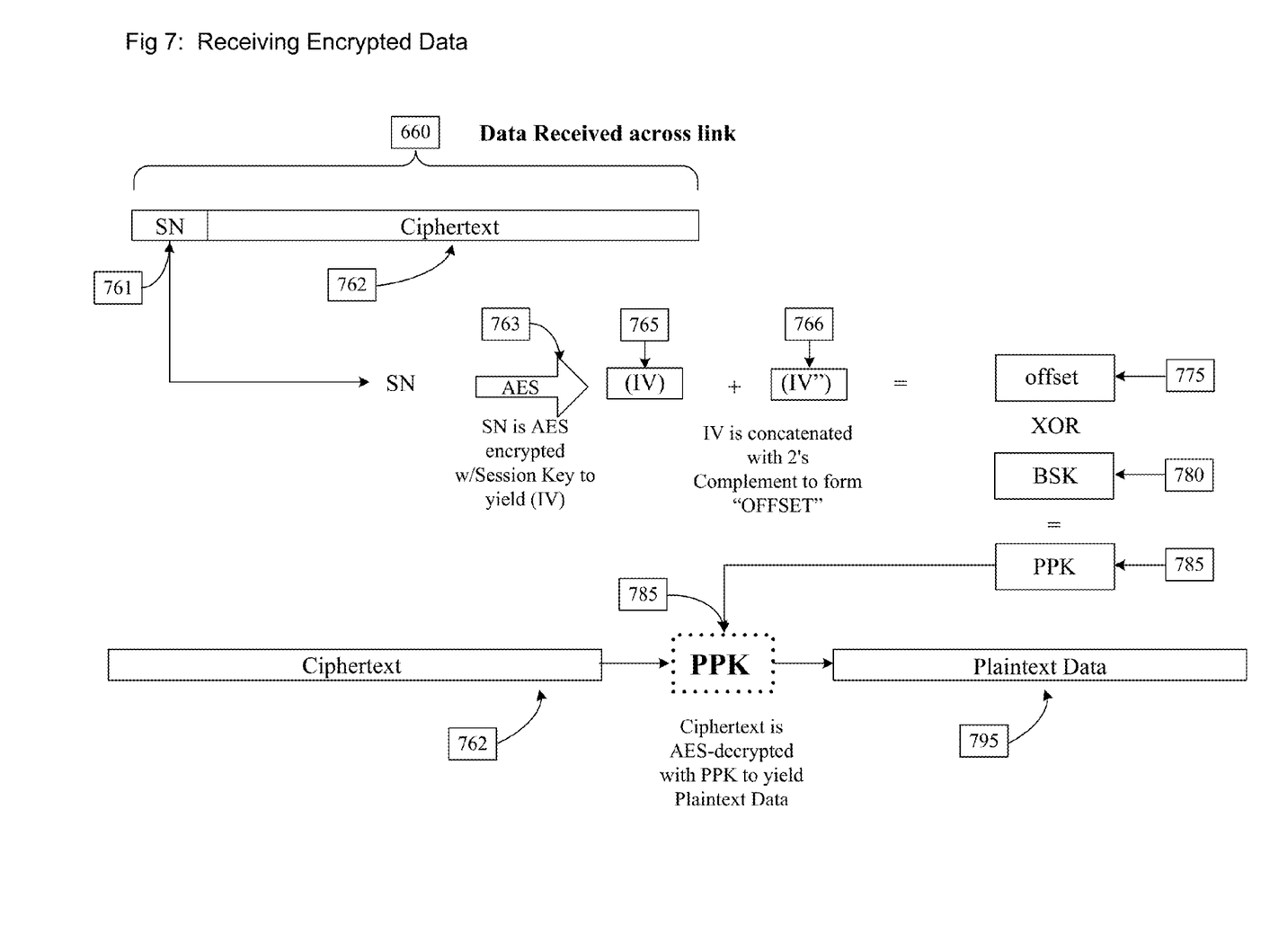
FIG. 7 is a schematic diagram of steps used in recovering plaintext data on the receiving side of a communications link according to an embodiment of the present invention.

FIG. 7 illustrates steps in recovering the plaintext data on the receiving side of a communications link according to an embodiment of the present invention. As seen in FIG. 7, on receipt of the data packet (660), the SN is extracted and encrypted (using the same encryption algorithm as in the embodiment of FIGS. 5 and 6) with the BSK yielding the IV (665). The IV (665) is concatenated with the two's complement of itself (666) to form the offset (670). The offset (670) is then exclusive-OR'd with the BSK (680) to form the PPK (685). The ciphertext portion (662) of the received data packet (660) is then decrypted with the PPK (695) in step 690. This yields the plaintext data (695) originally encrypted by the sending side. Various techniques known by those of ordinary skill in the art may be used to verify packet integrity. By way of non-limiting example, techniques such as embedding a CRC-32 or hash in the decrypted data may be used to verify packet integrity.

A further benefit of this invention is that the sequence numbers (610) are incremented, in one embodiment, such that each packet is uniquely identified. Properly implemented, the sequence number is never repeated in succession nor utilized again during the course of an authenticated session. As such, the sequence number (610) can be utilized to mitigate replay attacks. Replay attacks often succeed by recording transmission for replay later. Even though the attacker might not be able to decrypt a packet, the attacker will replay the packets later to spoof legitimate transmission. For example, an encrypted video feed might prevent an interloper from viewing the actual encrypted video transmission. The interloper could simply record the encrypted data and play it back later while disabling the legitimate encrypted video feed. The security station would receive the unaltered (but old) encrypted video data and think operation is normal and thus not realize the security threat. The embedded, non-repeating sequence numbers (SN, 610) can be utilized by the receiving side to ensure that once a legitimate packet is received, any attempt to replay a previously received packet will be detected.

Although AES is disclosed at various stages herein, other embodiments of the present invention may use other methods of modern symmetric key algorithms. Any encryption algorithm where the sender and receiver share a secret key that is set up in advance may be employed. For example, symmetric key algorithms such as DES, 3DES, AES, or International Data Encryption Algorithm (IDEA) may be used.

As used herein, the term "packet" embraces a single datum or group of data enveloped for transfer over a communications network. An entire file or collection of files enveloped together in may also be considered a packet. In general, the invention includes the ability to provide keys used for the ciphering or authentication that are generated or derived per datum, packet, or session.

We claim:

1. A method of authenticating a client device to a remote lock device in preparation for per-packet keying, comprising:
generating, on a smart token of the client device, a first random number;
encrypting, on the client device, the first random number with a secret key to generate a first ciphertext;
transmitting, to the remote lock device, the first ciphertext and a serial number associated with the smart token in a first authentication packet via a network;
receiving, from the remote lock device, a second authentication packet comprising a second ciphertext via the network, wherein a second random number is encrypted with the secret key to generate the second ciphertext;
decrypting, on the client device, the received second ciphertext to yield the second random number; and
generating, on the client device, a session key using the first random number and the second random number, whereby the client device employs the session key as a base session key to generate a per packet key, wherein a new per packet key is generated for each packet using the base session key and an offset value, wherein the offset is based on a random number that is incremented for each packet generated by:
   generating a random number that is incremented for each packet starting with the number zero to form a sequence number;
   encrypting the sequence number with the base session key to yield an initialization vector; and
   concatenating the initialization vector with a two's complement of the initialization vector.

2. The method of claim 1, wherein the secret key is pre-stored on the smart token.

3. The method of claim 1, wherein the serial number uniquely identifies the smart token.

4. The method of claim 1, further comprising the remote lock device using the serial number to access an enciphered version of the secret key.

5. The method of claim 4, further comprising the remote lock device retrieving the enciphered version of the secret key from a lock database.

6. The method of claim 1, wherein generating the session key further comprises concatenating the first random number and the second random number to generate a concatenated string.

7. The method of claim 6, further comprising applying a hash function to the concatenated string.

8. The method of claim 1, wherein the secret key is stored with the client device.

9. The method of claim 1, wherein the secret key is unique to the client device.

10. A method of authenticating a client device to a remote lock device in preparation for per-packet keying, comprising the steps of:
   receiving, from the client device, a first authentication packet comprising a serial number associated with a smart token coupled to the client device and a first ciphertext, wherein a first random number is encrypted with a secret key associated with the smart token to generate the first ciphertext;
   retrieving, from a lock database, an enciphered version of the secret key associated with the smart token using the serial number;
   decrypting, on the remote lock device, the enciphered version of the secret key to yield a plaintext version of the secret key;
   decrypting, on the remote lock, the first ciphertext with the plaintext version of the secret key to yield the first random number;
   generating, on the remote lock device, a second random number;
   encrypting, on the remote lock device, the second random number with the plaintext version of the secret key to generate a second ciphertext;
   transmitting, to the client device, the second ciphertext in a second authentication packet via a network; and
   generating, on the remote lock device, a session key using the first random number and the second random number, whereby the session key is used as a base session key to generate a per packet key, wherein a new per packet key is generated for each packet using the base session key and an offset value, wherein the offset is based on a random number that is incremented for each packet generated by:
   generating a random number that is incremented for each packet starting with the number zero to form a sequence number;
   encrypting the sequence number with the base session key to yield an initialization vector; and
   concatenating the initialization vector with a two's complement of the initialization vector.

11. The method of claim 10, wherein the secret key is pre-stored on the smart token.

12. The method of claim 10, wherein the serial number uniquely identifies the smart token.

13. The method of claim 10, wherein generating the session key further comprises concatenating the first random number and the second random number to generate a concatenated string.

14. The method of claim 10, further comprising applying a hash function to the concatenated string.

15. The method of claim 10, wherein the secret key is a unique secret key.

16. A system for authenticating devices in preparation for per-packet keying, comprising:
   a smart-card enabled client computing device configured to:
      generate a first random number on a smart token;
      encrypt the first random number with a secret key to generate a first ciphertext;
      transmit, to a remote lock device, the first ciphertext and a serial number associated with the smart token;
      receive, from the remote lock device, a second ciphertext, wherein a second random number is encrypted with the secret key to generate the second ciphertext;
      decrypt the second ciphertext to yield the second random number;
      generate a session key using the first random number and the second random number; and
   a data network for facilitating communication between the smart-card enabled client device and the remote device, whereby the client device uses the session key as a base session key to generate a per packet key, wherein a new per packet key is generated for each packet using the base session key and an offset value, wherein the offset is based on a random number that is incremented for each packet generated by:
      generating a random number that is incremented for each packet starting with the number zero to form a sequence number;
      encrypting the sequence number with the base session key to yield an initialization vector; and
      concatenating the initialization vector with a two's complement of the initialization vector.

17. The system of claim 16, wherein the secret key is pre-stored on the smart token.

18. The system of claim 16, wherein the serial number uniquely identifies the smart token.

19. The system of claim 16, wherein the session key is generated by concatenating the first random number and the second random number to generate a concatenated string.

20. The system of claim 19, wherein a hash function is applied to the concatenated string.

21. The system of claim 16, wherein the secret key is stored with the smart-card enabled client device.

22. The system of claim 16, wherein the secret key is unique to the smart-card enabled client device.

* * * * *